United States Patent
Onoda et al.

(10) Patent No.: US 8,360,530 B2
(45) Date of Patent: Jan. 29, 2013

(54) VEHICLE SEAT

(75) Inventors: Keisuke Onoda, Nagoya (JP); Kenji Hattori, Toyota (JP); Haruo Gotou, Toyota (JP); Osamu Fujimoto, Nissin (JP); Teiji Mabuchi, Aichi-ken (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 417 days.

(21) Appl. No.: 12/623,633

(22) Filed: Nov. 23, 2009

(65) Prior Publication Data
US 2010/0133891 A1 Jun. 3, 2010

(30) Foreign Application Priority Data
Nov. 28, 2008 (JP) ................. 2008-304209

(51) Int. Cl.
*A47C 7/02* (2006.01)
(52) U.S. Cl. ......... 297/452.27; 297/452.21; 297/452.26; 297/452.48
(58) Field of Classification Search ............. 297/452.21, 297/452.26, 452.27, 452.29, 452.39, 452.48, 297/452.58; 5/653, 655.9
See application file for complete search history.

(56) References Cited

U.S. PATENT DOCUMENTS

| | | | | |
|---|---|---|---|---|
| 3,531,552 A | * | 9/1970 | Getz et al. | 264/46.7 |
| 4,755,411 A | * | 7/1988 | Wing et al. | 428/71 |
| 5,137,333 A | * | 8/1992 | Chee | 297/452.21 |
| 5,442,823 A | * | 8/1995 | Siekman et al. | 5/653 |
| 5,592,707 A | * | 1/1997 | Dinsmoor et al. | 5/654 |
| 5,671,977 A | * | 9/1997 | Jay et al. | 297/452.24 |
| 5,687,436 A | * | 11/1997 | Denton | 5/653 |
| 5,882,073 A | * | 3/1999 | Burchi et al. | 297/218.2 |
| 6,571,411 B1 | * | 6/2003 | Ebe | 5/653 |
| 2004/0084937 A1 | * | 5/2004 | Berta | 297/180.14 |
| 2005/0140199 A1 | * | 6/2005 | Kang et al. | 297/452.27 |
| 2007/0241604 A1 | * | 10/2007 | Saitou et al. | 297/452.26 |
| 2008/0079306 A1 | * | 4/2008 | Whelan et al. | 297/452.41 |
| 2009/0146483 A1 | | 6/2009 | Niwa et al. | |
| 2009/0227913 A1 | | 9/2009 | Moriyama et al. | |

FOREIGN PATENT DOCUMENTS

| | | |
|---|---|---|
| JP | 10-33297 | 2/1998 |
| JP | 2005-74108 | 3/2005 |
| JP | 2006-75589 | 3/2006 |

OTHER PUBLICATIONS

English language Abstract of JP 10-33297, Feb. 10, 1998.
English language Abstract of JP 2006-75589, Mar. 23, 2006.
English language Abstract of JP 2005-74108, Mar. 24, 2005.

* cited by examiner

*Primary Examiner* — David Dunn
*Assistant Examiner* — Philip Gabler
(74) *Attorney, Agent, or Firm* — Greenblum & Bersntein, P.L.C.

(57) ABSTRACT

A vehicle seat includes a pad that is made of resin foam, and that forms a seat cushion or a seatback. The pad has a layered structure formed of a surface layer pad that forms a seating surface-side portion of the pad and a back layer pad that is provided on the back side of the surface layer pad. The back layer pad is higher in hardness and lower in density than the surface layer pad.

13 Claims, 4 Drawing Sheets

VEHICLE SEAT

INCORPORATION BY REFERENCE

The disclosure of Japanese Patent Application No. 2008-304209 filed on Nov. 28, 2008 including the specification, drawings and abstract is incorporated herein by reference in its entirety.

BACKGROUND OF THE INVENTION

1. Field of the Invention

The invention relates to a vehicle seat that is mounted in a vehicle, for example, a car.

2. Description of the Related Art

A vehicle seat usually includes a pad made of resin foam, for example, urethane foam, and a seat upholstery that covers the surface of the pad. Japanese Patent Application Publication No. 10-33297 (JP-A-10-33297) describes a pad which includes a first pad portion that is located under buttocks of a user and a second pad portion that is a portion of the pad other than the first pad portion. The first pad portion and the second pad portion are arranged next to each other. The second pad portion is made of urethane foam that is lower in density and higher in rebound elastic modulus than the first pad portion. The light second pad portion contributes to weight reduction of the pad as a whole. In addition, the first pad portion is used as a portion of the pad, which is located under the buttocks and therefore has a great influence on comfort of the user, and the second pad portion is used as a portion of the pad, which does not have a great influence on comfort of the user. With this arrangement, the comfort of the seat is appropriately maintained. Japanese Patent Application Publication No. 2006-75589 (JP-A-2006-75589) and Japanese Patent Application Publication No. 2005-74108 (JP-A-2005-74108) each describe a pad which includes a pad body and an fitted body that is fitted in a recess formed in the back face of the pad body and that is higher in hardness than the pad body.

However, the pad described in JP-A-10-33297 may cause discomfort to a user seated in the vehicle seat because the elastic deformation volume changes at the boundary between the first pad portion and the second pad portion. In contrast, the pad described in each of JP-A-2006-75589 and JP-A-2005-74108 provides a user with a higher level of comfort and holds the user more stably because a seating surface portion is soft and a back side portion is hard. However, there have been demands for lighter pads.

SUMMARY OF THE INVENTION

The invention provides a more comfortable and lighter vehicle seat.

An aspect of the invention relates to a vehicle seat which includes a pad that is made of resin foam, and that forms a seat cushion or a seatback. The pad has a layered structure formed of a surface layer pad that forms a seating surface-side portion of the pad and a back layer pad that is provided on a back side of the surface layer pad. The back layer pad is higher in hardness and lower in density than the surface layer pad.

Therefore, it is possible to adjust the hardness of the pad by adjusting the thickness of the surface layer pad and the thickness of the back layer pad. As a result, it is possible to provide the user with a higher level of comfort. In an existing pad, pad portions having different hardness are arranged next to each other. Therefore, when a user is seated on this pad, a discomfort is caused to the user due to a step formed between the pad portions. However, in the above-described aspect, the surface layer pad forms the seating surface-side portion of the pad. Therefore, a discomfort is not caused to the user unlike the existing pad. In addition, the seat according to the aspect of the invention is considerably comfortable because the soft surface layer pad forms the seating surface-side portion. The back layer pad has a low density and a high hardness. This contributes to weight reduction of the pad, and increases the stiffness of the pad as a whole.

In the aspect of the invention described above, the pad may form the seat cushion on which a user is seated, and the surface layer pad may form the entirety of the seating surface-side portion of the pad. In addition, recesses may be formed in a back face of the surface layer pad at a front end portion and a rear end portion, and the back layer pad may be fitted in the recesses. Therefore, in the pad, the front end portion and the portion posterior to and below the buttocks of the user are harder than the other portion. Therefore, it is possible to suppress sinking of the front end portion, that is the portion under the lower portions of the thighs of the user, and the portion posterior to and below the buttocks in the pad. Thus, it is possible to suppress occurrence of the situation where the user slips or is displaced in the fore-and-aft direction.

In the aspect of the invention described above, the surface layer pad may forms the entirety of the seating surface-side portion of the pad, a recess may be formed in a backside perimeter portion of the surface layer pad, and the back layer pad may be fitted in the recess. Therefore, the perimeter portion is harder than the other portion in the pad. Thus, the pad is less likely to lose its appropriate shape. In some existing pads, metal wires are provided to keep their shapes. However, with the configuration described above, metal wires are no longer necessary, which contributes to weight reduction of a seat.

The vehicle seat according the aspect of the invention may further include a seat upholstery that covers a seating surface of the pad. A fit groove may be formed in the back layer pad, and a clip attached to an end portion of the seat upholstery may be engaged with a wall face of the fit groove. When the clip is fitted in the fit groove, the end portion of the seat upholstery is held by the pad. Because the back layer pad has a sufficient hardness, the clip is stably held in the fit groove formed in a portion of the back layer pad. Therefore, the end portion of the seat upholstery is held by the pad without increasing the number of components.

The vehicle seat according to the aspect of the invention may further include a fitting which includes a plate that is embedded in the back layer pad when the pack layer pad is formed, and a fit portion that extends from the plate, that protrudes from the back layer pad, and that is fitted to a vehicle body. Because the back layer pad has a sufficient hardness, the fitting is stably held by the back layer pad. In addition, because the fitting includes the plate that is provided in the back layer pad, the fitting is held by the back layer pad at a portion having a relatively large area. Therefore, the fitting is reliably held by the back layer pad.

BRIEF DESCRIPTION OF THE DRAWINGS

The features, advantages and technical and industrial significance of this invention will be described in the following detailed description of an example embodiment of the invention with reference to the accompanying drawings, in which like numerals denote like elements, and wherein.

DETAILED DESCRIPTION OF THE EMBODIMENT

Figure 1:
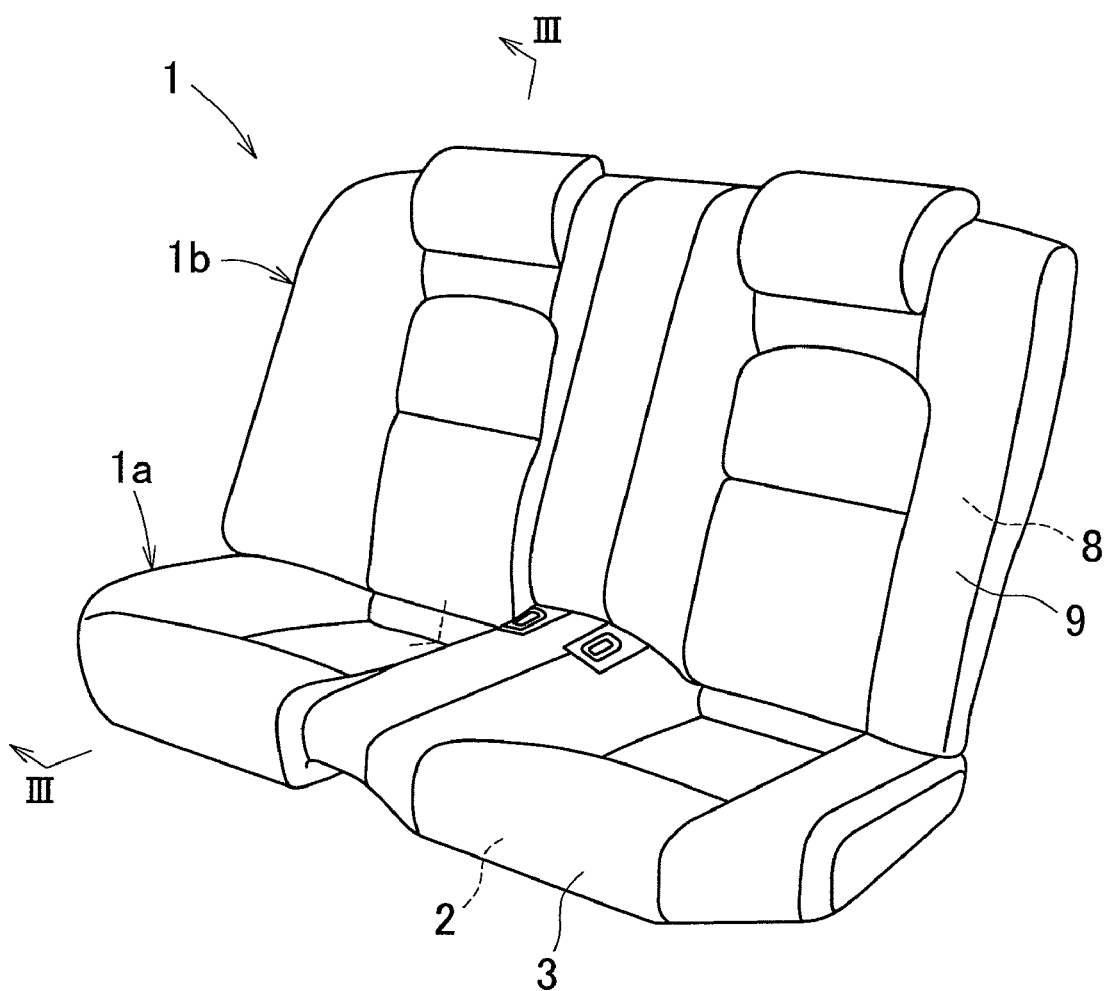
FIG. 1 is a perspective view of a vehicle seat.

An embodiment of the invention will be described below with reference to FIGS. 1 to 4. As shown in FIG. 1, a vehicle seat 1 is a seat that is provided in a vehicle, for example, a car, and is used as, for example, a rear seat. The vehicle seat 1 is a bench seat that has a width substantially equal to the width of a vehicle body. The vehicle seat 1 includes a seat cushion 1a on which a plurality of users may be seated, and a seatback 1b that extends from the rear end portion of the seat cushion 1a, and that holds the back of a user. As shown in FIGS. 1 and 3, the seat cushion 1a includes a pad 2 and a seat upholstery 3 that covers the seating surface of the pad 2, and the seatback 1b includes a pad 8 and a seat upholstery 9 that covers the seating surface of the pad 8.

The pad 2 includes a surface layer pad 4 that forms the seating surface-side portion of the pad 2 and a back layer pad 5 that is arranged on the back side of the surface layer pad 4. The surface layer pad 4 is made of resin foam, for example, urethane foam made by foaming polyurethane. The surface layer pad 4 has sufficient elasticity. The density $\rho$ of the surface layer pad 4 is set based on, for example, a foaming rate (unit volume/weight). The density $\rho$ is set to, for example, approximately $0.045 \pm 0.005$ g/cm$^3$.

The surface layer pad 4 has a seating surface portion 4a and bulge portions 4b that are integrally formed. The shape and the area of the seating surface portion 4a are set in such a manner that the seating surface portion 4a forms the entire seating surface of the seat cushion 1a. The bulge portions 4b bulge from the backside center portion of the seating surface portion 4a. A recess 4c, a recess 4d and recesses 4e are formed in the back face of the surface layer pad 4. The recess 4c extends along the front end of the surface layer pad 4, the recess 4d extends along the rear end of the surface layer pad 4, and the recesses 4e extend along the right end and the left end of the surface layer pad 4. Due to formation of these recesses 4c, 4d and 4e, the perimeter portion of the surface layer pad 4 is thinner than the other portion of the surface layer pad 4.

The back layer pad 5 is made of resin foam made by foaming resin, for example, AS resin (acrylonitrile styrene copolymer). The back layer pad 5 is higher in hardness and elastic modulus than the surface layer pad 4. The density $\rho$ of the back layer pad 5 is lower than the density $\rho$ of the surface layer pad 4, and is, for example, approximately $0.035 \pm 0.005$ g/cm$^3$. The volume of the back layer pad 5 is set to approximately one-third of the volume of the entirety of the pad 2. For example, the volume of the back layer pad 5 is set to approximately one-fourth to approximately half of the volume of the entirety of the pad 2.

Figure 2:
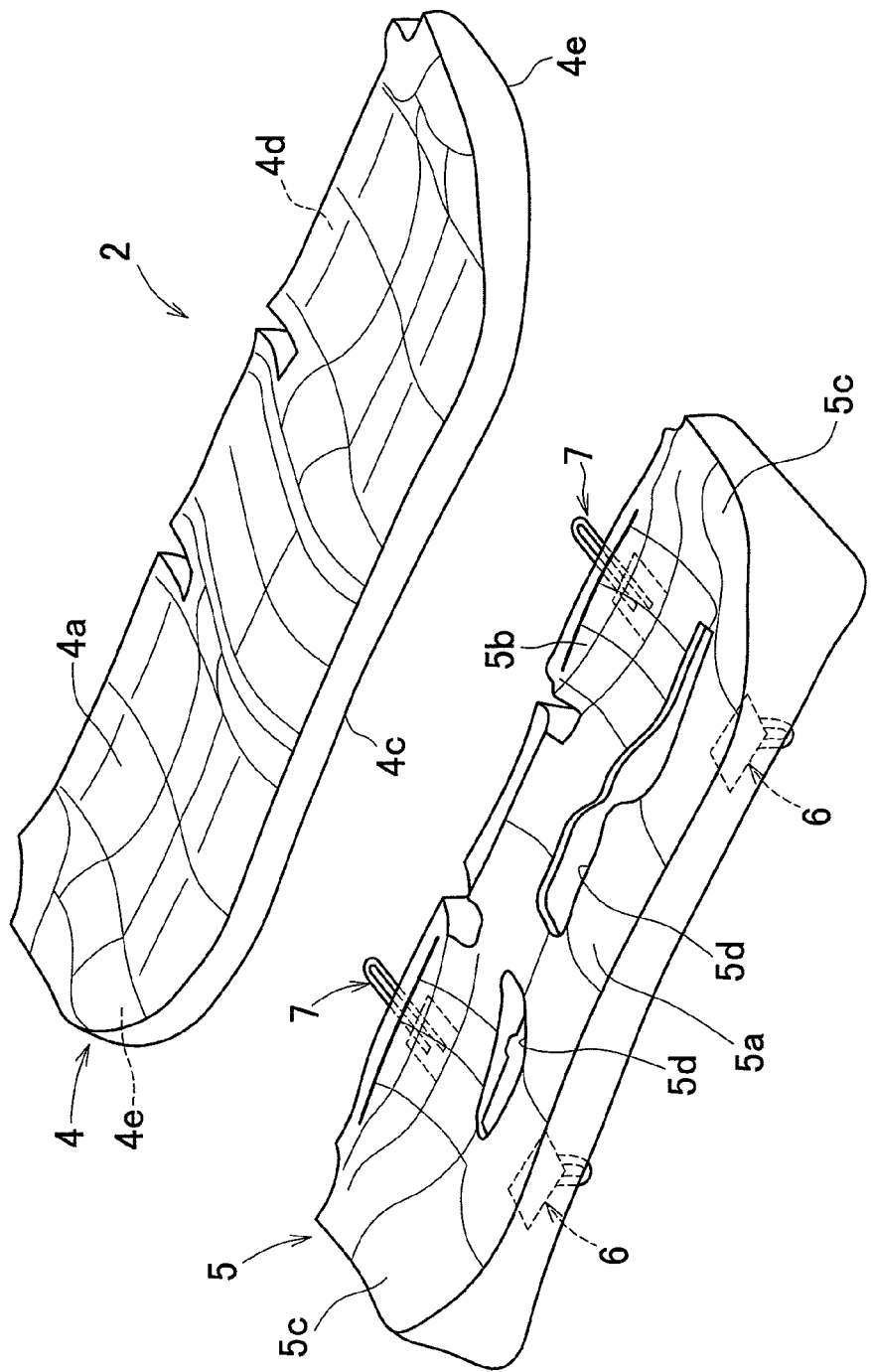
FIG. 2 is an exploded perspective view of a pad.
Figure 3:
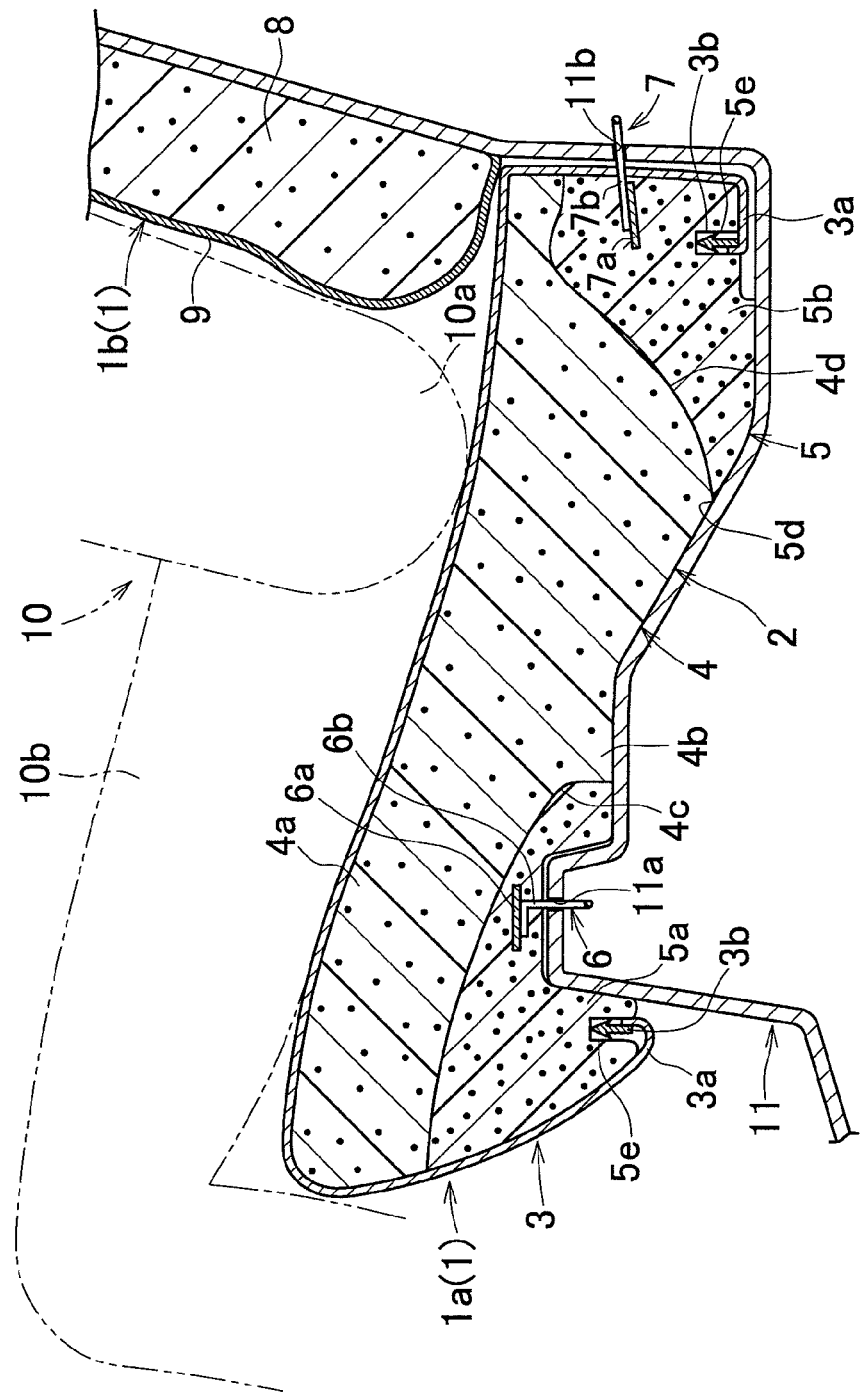
FIG. 3 is a cross-sectional view taken along the line in FIG. 1.

As shown in FIGS. 2 and 3, projections 5a, 5b and 5c are formed in the perimeter portion of the back layer pad 5, and holes 5d are formed in the center portion of the back layer pad 5. The projection 5a forms the front end portion of the back layer pad 5, and is fitted in the recess 4c of the surface layer pad 4. The projection 5b forms the rear end portion of the back layer pad 5, and is fitted in the recess 4d of the surface layer pad 4. The projections 5c form the right and left end portions of the back layer pad 5, and are fitted in the recesses 4e of the surface layer pad 4. The holes 5d pass through the back layer pad 5 in its thickness direction. The bulge portions 4b of the surface layer pad 4 are fitted in the holes 5d.

As shown in FIG. 3, a plurality of fit grooves 5e is formed in the perimeter portion of the back face of the back layer pad 5. Each fit groove 5e has a predetermined width, and extends from the back face toward the surface of the back layer pad 5. Clips 3b attached to end portions 3a of the seat upholstery 3 are fitted in the fit grooves 5e. Hooks are formed at the ends of the clips 3b. When the clips 3b are fitted in the fit grooves 5e, the hooks are engaged with the wall faces of the fit grooves 5e. Thus, the clips 3b are prevented from being removed from the fit grooves 5e, and the end portions 3a of the seat upholstery 3 are held by the back face of the pad 2.

Figure 4:
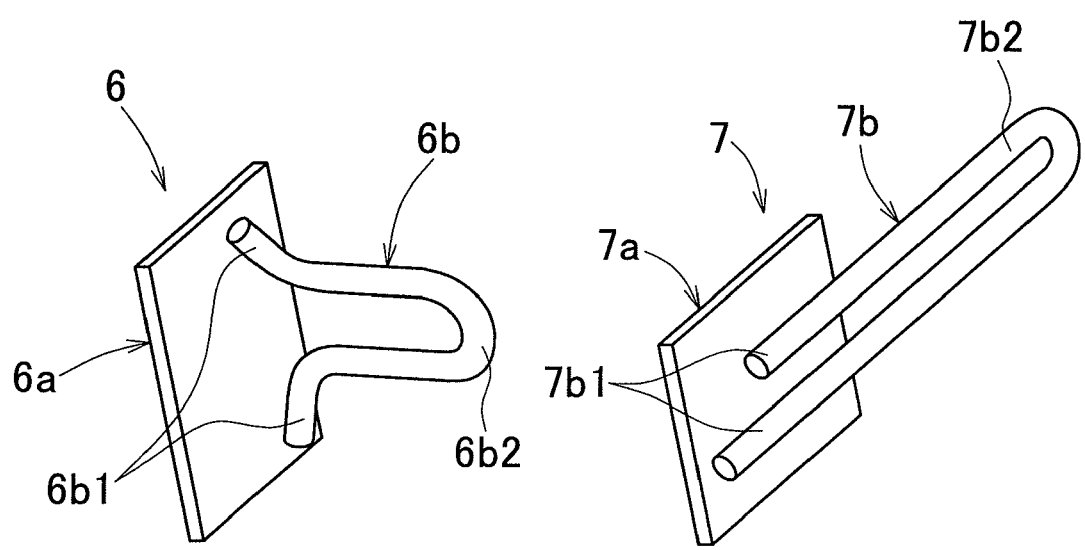
FIG. 4 is a perspective view of fittings.

As shown in FIGS. 2 and 3, the back layer pad 5 is provided with fittings 6 and 7 that are fitted to a vehicle body 11. The fittings 6 and 7 include metal plates 6a and 7a and fit portions 6b and 7b that are fitted to the plates 6a and 7a, respectively, as shown in FIG. 4. The fit portions 6b and 7b are made of metal wires. Both end portions 6b1 and both end portions 7b1 are welded to the plate 6a and the plate 7a, respectively. A U-shaped portion 6b2 and a U-shaped portion 7b2 are formed in the middle portion of the fit portion 6b and the middle portion of the fit portion 7b, respectively.

The fittings 6 and 7 are placed in a molding die when foam molding is performed to form the back layer pad 5. Thus, the fittings 6 and 7 are placed in the condition, shown in FIGS. 2 and 3, where the plates 6a and 7a and a part of each of the fit portions 6b and 7b are embedded in the back layer pad 5 and the other part of each of the fit portions 6b and 7b projects from the back layer pad 5. The fittings 6 are provided at the backside front portion of the back layer pad 5, and are fitted in fit holes 11a of the vehicle body 11. The fittings 7 are provided at the rear end portion of the back layer pad 5, and are fitted in fit holes 11b of the vehicle body 11. In this way, the seat cushion 1a is fitted to the vehicle body 11.

The pad 8 of the seatback 1b, as well as the surface layer pad 4, is made of resin foam, for example, urethane foam made by foaming polyurethane. The seat upholstery 9 is provided to cover the seating surface of the pad 8. Because the pad 8 has a single-layer structure, the hardness is substantially even all over the pad 8. In contrast, in the pad 2 of the seat cushion 1a, the hardness is adjusted by adjusting the proportion between the thickness of the front layer pad 4 and the thickness of the back layer pad 5. For example, the pad 2 is hard at a portion at which the surface layer pad 4 is thin and the hack layer pad 5 is thick, and is soft at a portion at which the surface layer pad 4 is thick and the back layer pad 5 is thin and a portion formed only of the surface layer pad 4.

As shown in FIG. 3, in the pad 2, the surface layer pad 4 is thin and the back layer pad 5 is thick at a portion posterior to and below buttocks 10a of a user 10 seated in the seat 1, and a front end portion, that is, a portion under lower portions of thighs 10b of the user 10. Therefore, these portions are harder than the other portion in the pad 2. In contrast, at a portion located between these hard portions, that is, a portion under the buttocks 10a, the surface layer pad 4 is thick and only the surface layer pad 4 is provided. Therefore, this portion is softer than the other portion in the pad 2.

As described above, the pad 2 has a layered structure formed of the surface layer pad 4 and the back layer pad 5, as shown in FIG. 3. The back layer pad 5 is higher in hardness and lower in density than the surface layer pad 4. Therefore, it is possible to adjust the hardness of the pad 2 by adjusting the thickness of the surface layer pad 4 and the thickness of the back layer pad 4. As a result, it is possible to provide the user with a higher level of comfort. In an existing pad, pad portions having different hardness are arranged next to each other. Therefore, when a user is seated on this pad, a discomfort is caused to the user due to a step formed between the pad portions. However, the surface layer pad 4 forms the entirety of the seating surface-side portion of the pad 2. Therefore, a discomfort is not caused to the user unlike the existing pad. In addition, the seat 1 is considerably comfortable because the soft surface layer pad 4 forms the seating surface-side portion. The back layer pad 5 has a low density and a high hardness. This contributes to weight reduction of the pad 2, and increases the stiffness of the pad 2 as a whole.

The surface layer pad 4 forms the entirety of the seating surface-side portion of the pad 2, as shown in FIG. 3. The surface layer pad 4 has the recess 4c formed at the front end portion of the pad 2, and the recess 4d formed at the portion posterior to and below the buttocks 10a. The back layer pad 5 is fitted in the recesses 4c and 4d. Therefore, in the pad 2, the front end portion and the portion posterior to and below the buttocks 10a are harder than the other portion. Therefore, it is possible to suppress sinking of the front end portion, that is the portion under the lower portions of the thighs 10b, and the portion posterior to and below the buttocks 10a in the pad 2. Thus, it is possible to suppress occurrence of the situation where the user 10 slips or is displaced in the fore-and-aft direction.

As shown in FIG. 2, the surface layer pad 4 forms the entirety of the seating surface-side portion of the pad 2, the recesses 4c to 4e are formed in the backside perimeter portion of the pad 2, and the back layer pad 5 is fitted in the recesses 4c to 4e. Therefore, the perimeter portion is harder than the other portion in the pad 2. Thus, the pad 2 is less likely to lose its appropriate shape. In some existing pads, metal wires are provided to keep their shapes. However, according to the embodiment of the invention, metal wires are no longer necessary, which contributes to weight reduction of a seat.

As shown in FIG. 3, the fit grooves 5e are formed in the back layer pad 5. Therefore, when the clips 3b are fitted in the fit grooves 5e, the end portions of the seat upholstery 3 are held by the pad 2. Also, because the back layer pad 5 has a sufficient hardness, the clips 3b are stably held in the fit grooves 5e formed in some portions of the back layer pad 5. Therefore, the end portions of the seat upholstery 3 are held by the pad 2 without increasing the number of components.

The fittings 6 and 7 include the plates 6a and 6b that are embedded in the back layer pad 5 and the fit portions 6b and 7b that are fitted to the vehicle body 11, respectively, as shown in FIG. 3. Because the back layer pad 5 has a sufficient hardness, the fittings 6 and 7 are stably held by the back layer pad 5. In addition, because the fittings 6 and 7 include the plates 6a and 7a that are provided in the back layer pad 5, the fittings 6 and 7 are held by the back layer pad 5 at portions having relatively large areas. Therefore, the fittings 6 and 7 are reliably held by the back layer pad 5.

Note that, the invention is not limited to the above-described embodiment, and may be implemented in the following embodiments.

1) The pad 8 of the seatback 1b in the above-described embodiment has a single-layer structure. Alternatively, the pad of the seatback may have a layered structure formed of a surface layer pad and a back layer pad, as well as the pad 2 of the seat cushion 1a.

2) The pad 2 according to the above-described embodiment includes the surface layer pad 4 and the back layer pad 5 that are formed separately. Alternatively, the pad may be formed by, for example, double molding. In this way, the pad include surface layer pad and back layer pad that are formed integrally.

3) The pad 2 according to the above-described embodiment is mounted on the vehicle body 11 and is supported by the vehicle body 11. Alternatively, a seat may be provided with a seat frame, and the pad may be supported by the seat frame.

What is claimed is:

1. A vehicle seat, comprising,
   a pad of resin foam, and that comprises a seat cushion, on which a user can be seated,
   wherein
   the pad has a layered structure, including a surface layer pad that provides a seating surface-side portion of the pad and a back layer pad that is provided on a back side of the surface layer pad,
   the back layer pad is higher in hardness and lower in density than the surface layer pad,
   the surface layer pad provides an entirety of the seating surface-side portion of the pad;
   front and rear recesses are provided in a back face of the surface layer pad at a front end portion and a rear end portion, the front and rear recesses respectively extending to a front end and to a rear end of the pad;
   the back layer pad is fitted in the front and rear recesses such that the back layer pad is exposed to the exterior at the front and rear ends of the pad; and
   a thickness of the back layer pad exposed to the front end varies between a left end and a right end of the pad.

2. The vehicle seat according to claim 1, wherein:
   the hardness of the pad is not uniform within the pad; and
   the hardness of the pad is adjusted by adjusting a proportion between a thickness of the surface layer pad and the thickness of the back layer pad.

3. The vehicle seat according to claim 1, wherein:
   a proportion of a thickness of the surface layer pad to a thickness of the pad is lower in a perimeter portion of the pad than in a portion of the pad other than the perimeter portion.

4. The vehicle seat according to claim 1, wherein:
   the pad includes a first portion that supports buttocks of the user, and a second portion that is anterior to the first portion;
   in the first portion, a proportion of a thickness of the surface layer pad to a thickness of the pad is higher in a front portion than in a rear portion; and
   in the second portion, the proportion of the thickness of the surface layer pad to the thickness of the pad is higher in a rear portion than in a front portion.

5. The vehicle seat according to claim 4, wherein in the front portion of the first portion, the proportion of the thickness of the surface layer pad to the thickness of the pad is 100 percent.

6. The vehicle seat according to claim 1, wherein a portion of the pad, which is under buttocks of the user, includes only the surface layer pad.

7. The vehicle seat according to claim 1, further comprising,
   a seat upholstery that covers a seating surface of the pad, wherein
   a fit groove is formed in the back layer pad, and
   a clip attached to an end portion of the seat upholstery is engaged with a wall face of the fit groove.

8. The vehicle seat according to claim 1, further comprising,
   a fitting which includes a plate that is embedded in the back layer pad when the back layer pad is formed, and a fit portion that extends from the plate, that protrudes from the back layer pad, and that is fitted to a vehicle body.

9. The vehicle seat according to claim 1, wherein the thickness of the back layer pad exposed to the front end varies such that the thickness at the left and right ends is thicker than the thickness at the center between the left end and the right end.

10. The vehicle seat according to claim 1, wherein left and right recesses are provided in the back face of the surface layer pad at the left end and the right end of the pad, and
   the left and right recesses respectively extend along the left end and the right end of the pad and extend from the front end to the rear end of the pad.

11. The vehicle seat according to claim 1, wherein the rear recess extends along the rear end of the pad from the left end to the right end of the pad.

12. The vehicle seat according to claim 8, wherein the fit portion has a generally L-shape, and a portion of the fit portion extending generally perpendicular to the plate, protrudes from a bottom of the back layer pad, and is fitted to the vehicle body located below the back layer pad.

13. The vehicle seat according to claim 8, wherein the fit portion has a generally flat shape extending generally in parallel to the plate to protrude from the rear end of the back layer pad, and is fitted to the vehicle body located rear side of the back layer pad.

* * * * *